(12) United States Patent
Smith

(10) Patent No.: US 7,599,792 B1
(45) Date of Patent: *Oct. 6, 2009

(54) USING A CORRIDOR SEARCH TO IDENTIFY LOCATIONS OF INTEREST ALONG A TRAVEL ROUTE

(75) Inventor: Marc E. Smith, York, PA (US)

(73) Assignee: MapQuest, Inc., Denver, CO (US)

( * ) Notice: Subject to any disclaimer, the term of this patent is extended or adjusted under 35 U.S.C. 154(b) by 42 days.

This patent is subject to a terminal disclaimer.

(21) Appl. No.: 11/932,618

(22) Filed: Oct. 31, 2007

Related U.S. Application Data

(63) Continuation of application No. 11/682,151, filed on Mar. 5, 2007, now Pat. No. 7,324,896, which is a continuation of application No. 11/420,682, filed on May 26, 2006, now Pat. No. 7,194,357, which is a continuation of application No. 11/185,836, filed on Jul. 21, 2005, now Pat. No. 7,054,743, which is a continuation of application No. 10/632,808, filed on Aug. 4, 2003, now Pat. No. 6,954,697.

(51) Int. Cl.
*G01C 21/30* (2006.01)
(52) U.S. Cl. .................. 701/209; 701/200; 701/201; 701/208; 340/990; 340/995.19; 340/995.24
(58) Field of Classification Search .................. 701/200, 701/201, 208, 209; 340/990, 995.19, 995.24
See application file for complete search history.

(56) References Cited

U.S. PATENT DOCUMENTS

| | | |
|---|---|---|
| 5,504,482 A | 4/1996 | Schreder |
| 5,648,768 A | 7/1997 | Bouve |
| 5,752,217 A | 5/1998 | Ishizaki et al. |
| 6,175,800 B1 | 1/2001 | Mori et al. |
| 6,256,580 B1 | 7/2001 | Mels et al. |
| 6,282,489 B1 | 8/2001 | Bellesfield et al. |
| 6,321,158 B1 | 11/2001 | DeLorme et al. |
| 6,338,021 B1 | 1/2002 | Yagyu et al. |
| 6,349,261 B1 | 2/2002 | Ohnishi et al. |
| 6,351,707 B1 | 2/2002 | Ichikawa |
| 6,356,911 B1 | 3/2002 | Shibuya |

(Continued)

FOREIGN PATENT DOCUMENTS

WO    WO 00/22593    4/2000

OTHER PUBLICATIONS

Gross, E.M., et al., "The Aviation Route Forecast (ARF) Program—An Interactive System for Pilot Self-Briefing," *National Weather Digest*, vol. 9, No. 1, Feb. 1984, pp. 33-40.

*Primary Examiner*—Gertrude Arthur Jeanglaud
(74) *Attorney, Agent, or Firm*—Fish & Richardson P.C.

(57) ABSTRACT

A corridor search process is used to identify locations of interest along a travel route. The corridor search process identifies locations of interest along a travel route by using a grid search process that first identifies shape points that correspond to the travel route. Each shape point is associated with a portion of a grid system used to delineate a region of geography through which the route traverses. The portions of the grid system correspond to a corridor along the travel route. References to redundant portions of the grid system are removed, and locations of interest are identified based on an association between a location of interest with a particular portion of the grid system.

37 Claims, 12 Drawing Sheets

U.S. PATENT DOCUMENTS

| | | |
|---|---|---|
| 6,405,129 B1 | 6/2002 | Yokota |
| 6,427,118 B1 | 7/2002 | Suzuki |
| 6,434,482 B1 | 8/2002 | Oshida et al. |
| 6,498,982 B2 | 12/2002 | Bellesfield et al. |
| 6,542,814 B2 | 4/2003 | Polidi et al. |
| 6,587,782 B1 | 7/2003 | Nocek et al. |
| 6,691,128 B2 | 2/2004 | Natesan et al. |
| 7,054,743 B1 | 5/2006 | Smith |
| 7,324,896 B1 * | 1/2008 | Smith .................. 701/209 |
| 2003/0036848 A1 | 2/2003 | Sheha et al. |

* cited by examiner

| Shape Point | Grid Portion | Unique Grid Portions | Locations of Interest |
|---|---|---|---|
| 525a | 560a | 560a | 360a, 360b |
| 525b | 560a | | |
| 525c | 560b | 560b | 360c |
| 525d | 560c | 560c | 360d |
| 525e | 560c | | |
| 525f | 560e | 560e | |
| 525g | 560e | | |
| 525h | 560e | | |
| 525i | 560g | 560g | 360e |
| 525j | 560h | 560h | 360f |
| 525k | 560h | | |
| 525l | 560h | | |
| 525m | 560i | 560i | |

FIG. 6

USING A CORRIDOR SEARCH TO IDENTIFY LOCATIONS OF INTEREST ALONG A TRAVEL ROUTE

CROSS-REFERENCE TO RELATED APPLICATIONS

This application is a continuation application of U.S. application Ser. No. 11/682,151, filed Mar. 5, 2007, now allowed, which is a continuation of U.S. application Ser. No. 11/420,682, filed May 26, 2006 and titled "Using a Corridor Search to Identify Locations of Interest Along a Route," now issued, U.S. Pat. No. 7,194,357, which is a continuation of U.S. application Ser. No. 11/185,836 filed Jul. 21, 2005, now issued, U.S. Pat. No. 7,054,743, and titled "Using a Corridor Search to Identify Locations of Interest Along a Route," which is also a continuation of Ser. No. 10/632,808, filed Aug. 4, 2003, now issued U.S. Pat. No. 6,954,697 and titled "Using a Corridor Search to Identify Locations of Interest Along a Route," all of which are incorporated by reference in their entirety.

TECHNICAL FIELD

This description relates to identifying locations of interest along a travel route between an origin location and a destination location.

BACKGROUND

A preferred route between an origin location and a destination location may be determined by a computer system, which may be referred to as a mapping system. A user of a mapping system may desire to identify locations of interests near or along the travel route, such as a gas station, a restaurant, a rest area, an entertainment or educational opportunity, or a historical landmark. Searching for locations of interest near or along a travel route may be accomplished by using a proximity search that identifies a point along the route (such as an exit ramp) and searches for locations of interest within a radius around the point. Alternatively, a polygonal search may be performed to identify locations of interest within a particular shape of polygon, typically a square or rectangle, that overlays the route. These methods may identify locations that are not convenient to the travel route, such as locations that are too far from the route or locations that are not easily accessible to the route.

SUMMARY

In one general aspect, determining locations of interest for a route includes accessing shape points that correspond to a route from an origin to a destination. A portion of a grid that corresponds to a shape point is identified. Locations of interest are determined based on locations of interest that are associated with an identified portion of the grid. At least some of the determined locations of interest are identified as locations of interest for the route.

Implementations may include one or more of the following features. For example, the locations of interest for the route may be determined by identifying redundant portions of the grid that have been identified and eliminating the redundantly identified portions of the grid such that only non-redundant portions of the grid are identified as locations of interest for the route. Some of the determined locations of interest may be identified by eliminating any retrieved location of interest that is not within a predetermined distance of the route or not within a predetermined driving distance of the route.

The grid may be a multiple-level grid hierarchy. A spatial identifier of a portion of the multiple-level grid hierarchy may be associated with an accessed shape point. Locations of interest may be retrieved that are associated with a spatial identifier of a portion of the multiple-level grid hierarchy. Each level of the multiple-level grid hierarchy may include four quadrants.

Locations of interest may be determined by an on-board vehicle navigation system or a personal digital assistant. Locations of interest may be determined based on an indirect association between a location of interest and a shape point.

Implementations of the techniques described may include a method or process, an apparatus or system, or computer software on a computer-accessible medium. The details of one or more implementations are set forth below. Other features will be apparent from the description and drawings, and from the claims.

DESCRIPTION OF DRAWINGS

FIG. 6 is a diagram illustrating the results of using a corridor search to identify locations of interest along a travel route.

DETAILED DESCRIPTION

Techniques are provided for using a corridor search process to identify locations of interest near or along a travel route. A location of interest also may be referred to as a place of interest or a point of interest. Examples of a location of interest include a gas station, a restaurant, a lodging (such as a bed and breakfast, a motel, or a hotel), an entertainment and educational opportunity (such as an amusement park, a water park, a movie theater, a night spot, a museum, and a library), and a historical or another type of landmark.

More specifically, the corridor search process identifies locations of interest along a travel route using a grid search process that first identifies shape points that correspond to the travel route. Each shape point is associated with a portion of a grid system used to delineate a region of geography through which the route traverses. The portions of the grid system correspond to a corridor along the travel route. Redundant references to a portion of the grid system may be removed, and locations of interest are identified based on an association between a location of interest with a particular portion of the grid system. The grid system may be used to enable the indirect association of locations of interest with a travel route.

Using a grid system to identify a corridor along a travel route to search may enable a more efficient search for locations of interests than a polygonal search or a proximity search. Alternatively or additionally, the use of a corridor search may improve the search results by identifying locations that are near and/or easily accessible to the travel route.

Figure 1:
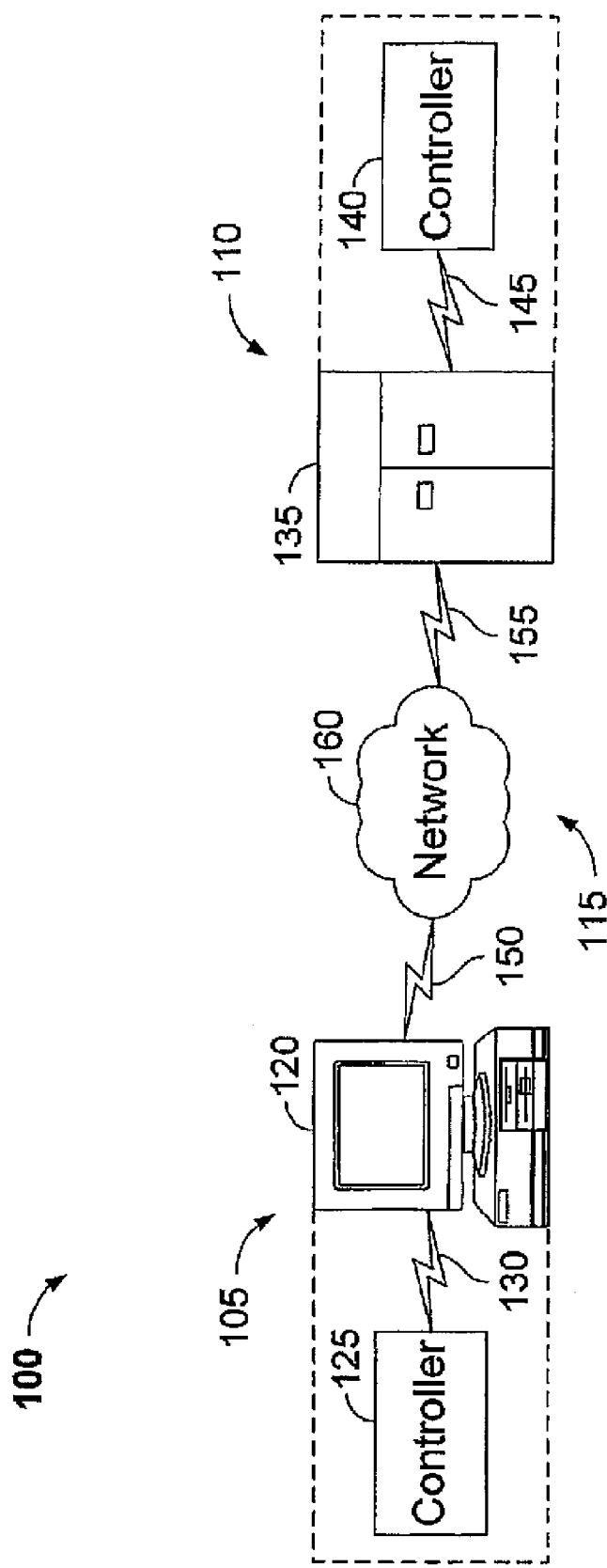
FIG. 1 is a block diagram of a communications system capable of using a corridor search process to identify a location of interest along a travel route.
Figure 2:
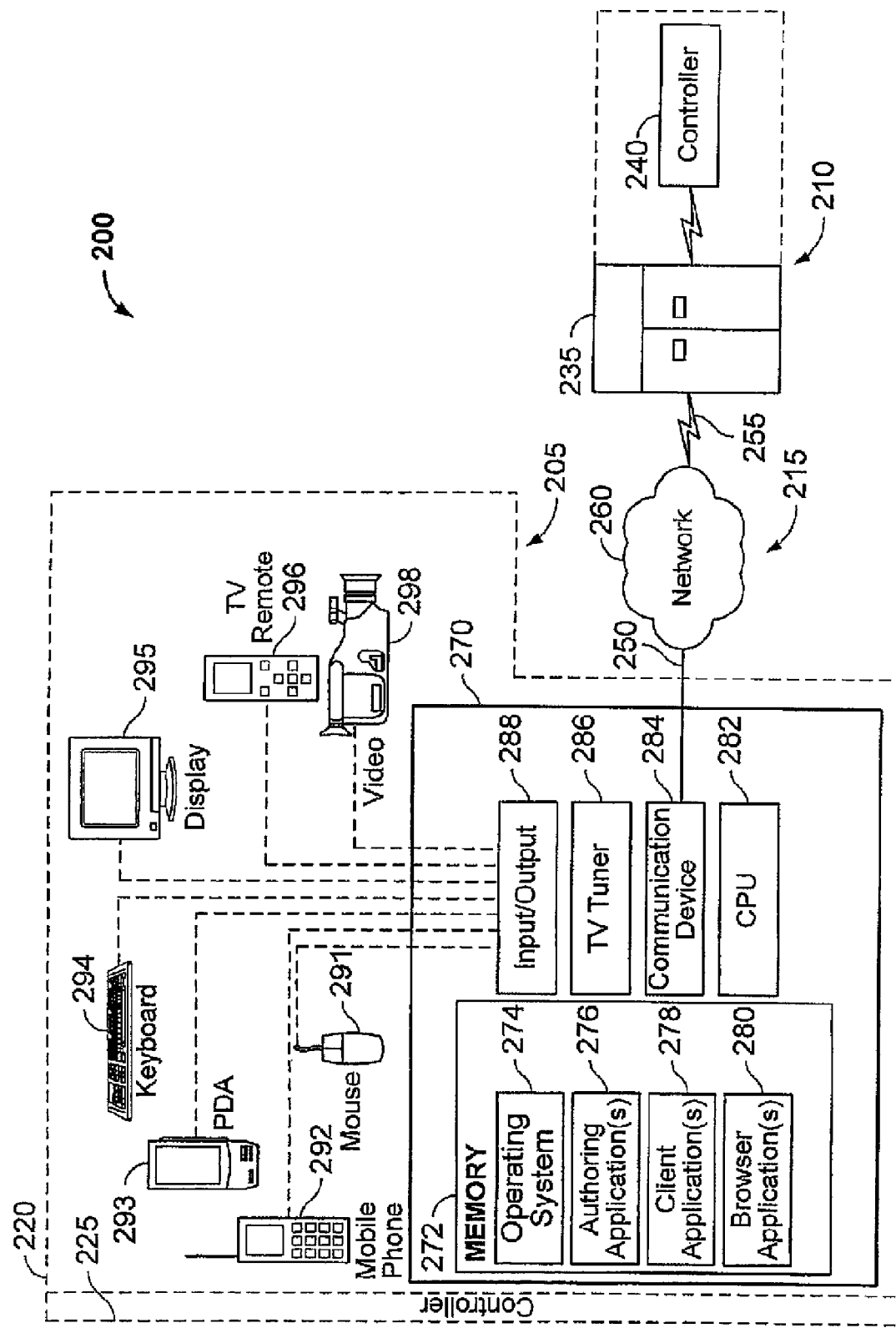
FIG. 2 is an expansion of the block diagram of FIG. 1.

For illustrative purposes, FIGS. 1 and 2 describe a communications system that may be used to request and provide routes between origin and destination locations. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 115 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 115) is generally capable of executing instructions under the command of a client controller 125 (or a host controller 140). The client device 120 (or the host device 115) is connected to the client controller 125 (or the host controller 140) by a wired or wireless data pathway 110 or 145 capable of delivering data.

Each of the client device 120, the client controller 125, the host device 115, and the host controller 140 typically includes one or more hardware components and/or software components. An example of a client device 120 or a host device 115 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of the client controller 125 or the host controller 140 is a software application loaded on the client device 120 or the host device 115 for commanding and directing communications enabled by the client device 120 or the host device 115. Other examples include a program, a piece of code, an instruction, a device, a computer, a computer system, or a combination thereof, for independently or collectively instructing the client device 120 or the host device 115 to interact and operate as described. The client controller 125 and the host controller 140 may be embodied permanently or temporarily in any type of machine, component, physical or virtual equipment, storage medium, or propagated signal capable of providing instructions to the client device 120 or the host device 115.

The communications link 115 typically includes a delivery network 160 that provides a direct or indirect communication link between the client system 105 and the host system 110, irrespective of physical separation. Examples of a delivery network 160 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Line"), HDSL ("High bit-rate Digital Subscriber Line"), and VDSL ("Very high bit-rate Digital Subscriber Line)), radio, television, cable, satellite, and/or any other delivery mechanism for carrying data. The communications link 115 may include communication pathways 150, 155 that enable communications through the one or more delivery networks 160 described above. Each of the communication pathways 150 and 155 may include, for example, a wired, a wireless, a cable or a satellite communications pathway.

FIG. 2 illustrates a communication system 200 including a client system 205 communicating with a host system 210 through a communications link 215. The client system 205 typically includes one or more client devices 220 and one or more client controllers 225 for controlling the client devices 220. The host system 210 typically includes one or more host devices 235 and one or more host controllers 240 for controlling the host devices 235. The communications link 215 may include communications pathways 250, 255 that enable communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to, and may illustrate one possible implementation of, the client system 105 of FIG. 1.

The client device 220 typically includes a general purpose computer 270 having an internal or external storage 272 for storing data and programs such as an operating system 274 (e.g., DOS, Windows®, Windows® 95, Windows® 98, Windows® 2000, Windows® NT, Windows® Millennium Edition, Windows® XP, OS/2, Linux, and other Unix-based operating systems) and one or more application programs. Examples of application programs include authoring applications 276 (e.g., word processing, database programs, spreadsheet programs, presentation programs, and graphics programs) capable of generating documents or other electronic content; client applications 278 (e.g., AOL ("America Online") client, CompuServe client, AIM ("America Online Instant Messenger") client, AOL TV ("America Online Television") client, and an ISP ("Internet Service Provider") client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer 270 typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by the communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some, all, or none of the components and devices described above.

Figure 3:
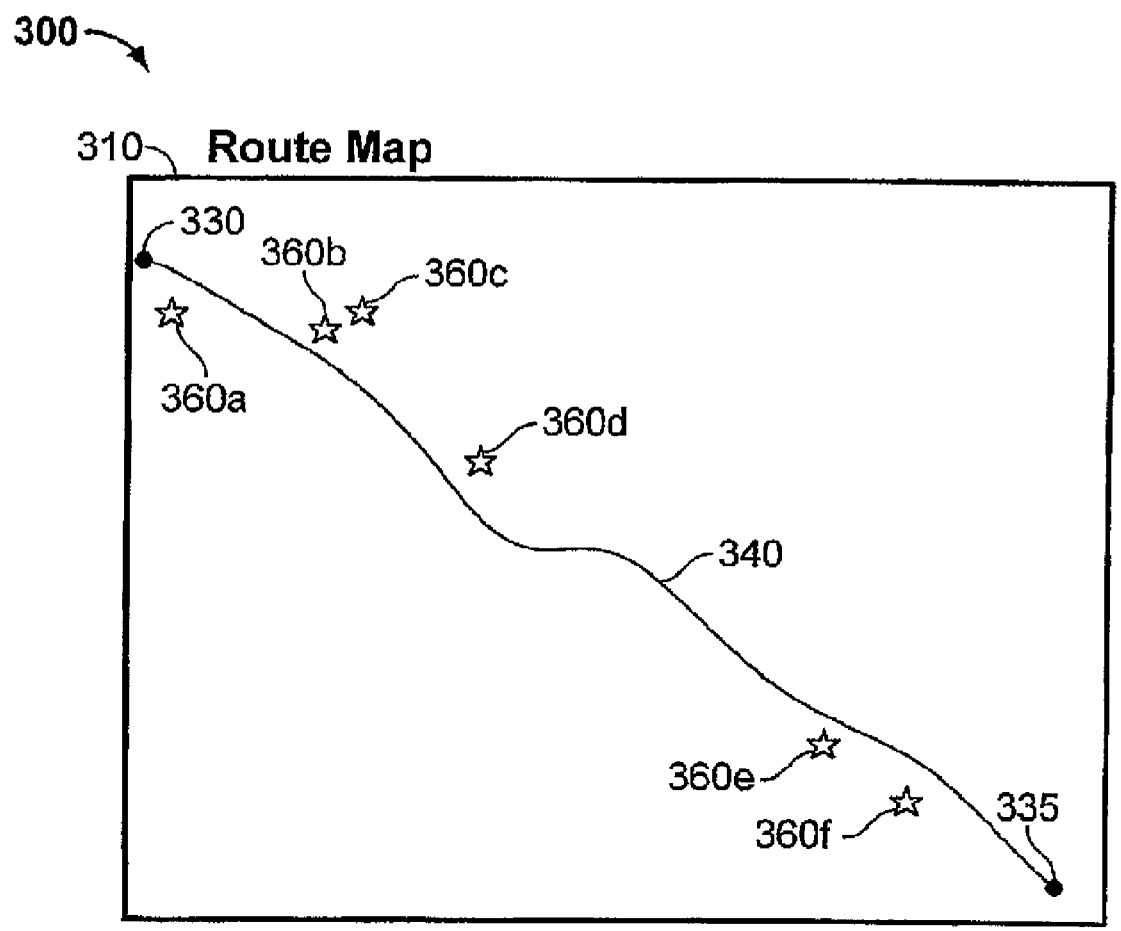
FIGS. 3, 3A, 5 and 9 are diagrams illustrating locations of interest along a travel route that have been identified by a corridor search.

FIG. 3 illustrates a route presentation 300 that presents the results of using a corridor search to identify locations of interest along a travel route ("a route"). The route presentation 300 may be displayed on the client system display 295 of FIG. 2, printed on a printer associated with the client system 205 of FIG. 2, or displayed on a display associated with an on-board vehicle navigation system. The route presentation 300 typically is presented in the form of a map and may be referred to as a route map 310.

The route map 310 includes an origin location 330, a destination location 335, and a route 340 between the origin location 330 and the destination location 335, In some implementations the route map 310 also may include a variable network or display of roadways and other geographic features that are near the route, such as hydrology (e.g., rivers, lakes and other bodies of water) and cities.

The route map 310 includes locations of interest 360*a*-360*f* that have been identified as occurring along the route 340. In the implementation of FIG. 3, the route map 310 presents each location of interest 360*a*-360*f* using a star symbol; however, other representations may be used, such as symbols, bit-mapped images, or image types (collectively, "symbols"). A symbol may represent a type of location of interest generally (e.g., a lodging, a restaurant, a gas station, an entertainment or educational opportunity, or a historical landmark) or it may be peculiar to a particular location of interest (e.g., the United States Capitol or a particular amusement park). Some implementations may use a single symbol to represent all locations of interest regardless of their type of location of interest. The inclusion of locations of interest in the route map 310 may help a user to plan activities along the route. The inclusion of locations of interest also may provide an opportunity for the route presentation provider to obtain revenue, for example, by enabling the provider to charge for the display of a location of interest on the route map 310, which may help create or invigorate a market for route presentation services. In one example, an Internet services provider may charge the owner of a location of interest a fee each time the location of interest is displayed on a route presented by the Internet services provider. Similarly, a mapping services provider may charge the owner of a location of interest a fee each time the location of interest is displayed on a route presented by the mapping services provider.

Figure 3A:
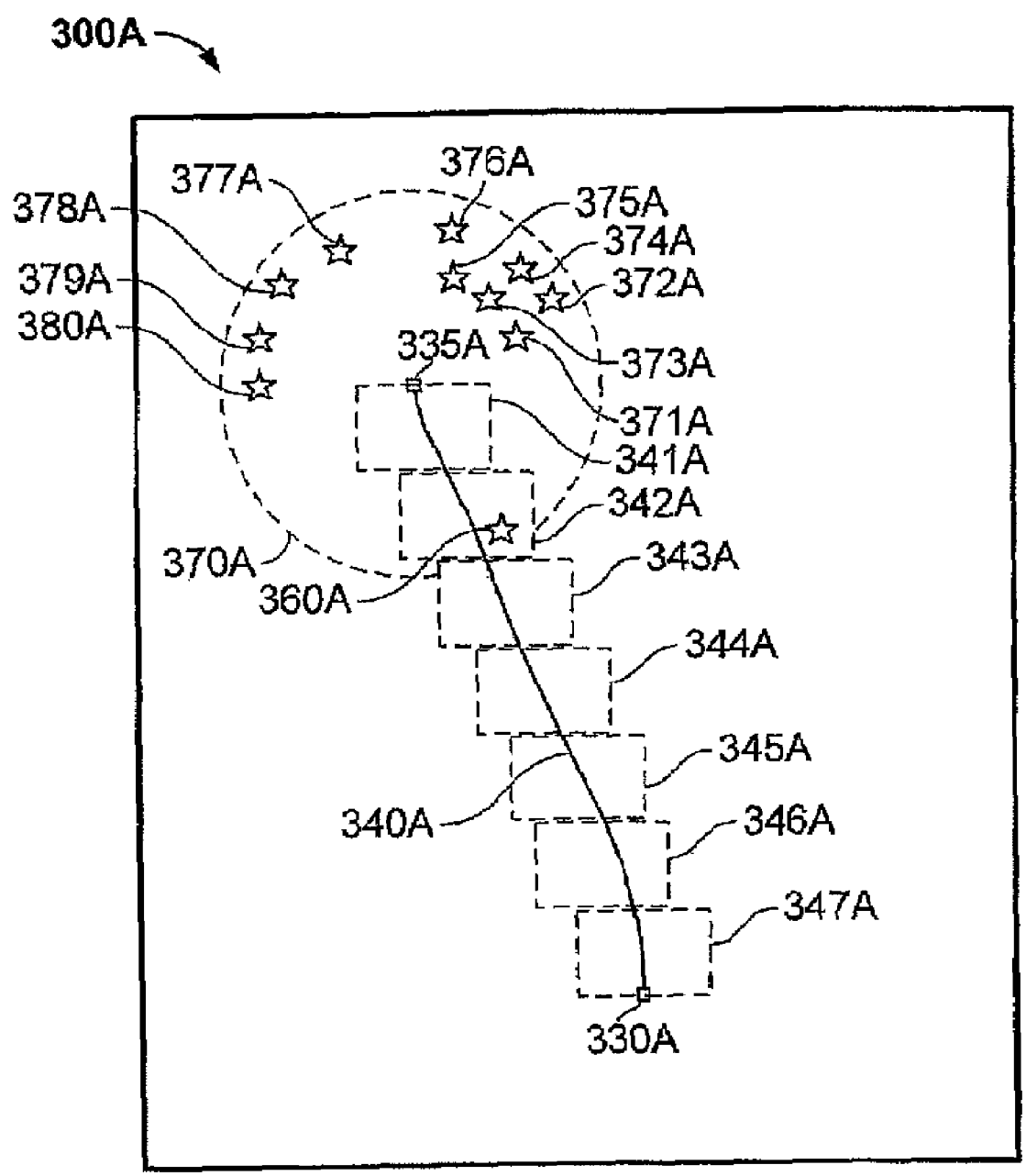

FIG. 3A shows an example of a portion of a corridor route presentation 300A that presents the results using a corridor search to identify locations of interest along a route. The route presentation 300A shows the results of a corridor search in contrast with the results of using a radius search to identify locations of interest along the route. The route presentation 300 may be displayed on the client system display 295 of FIG. 2, printed on a printer associated with the client system 205 of FIG. 2, or displayed on a display associated with an on-board vehicle navigation system.

In this example, the corridor route presentation 300A includes two exits 330A and 335A located along a portion 340A of a route that traverses an interstate highway. A corridor search has identified a corridor along the portion 340A of the route. The corridor includes a series of rectangles 341A-347A that correspond to a corridor for the route. The corridor route presentation 300A includes only one location of interest 360A that is located within one of the rectangles 341A-347A of the corridor. More specifically, the location of interest 360A is located within the rectangle 342A that is included in the corridor for the portion 340A of the route.

In contrast to using a corridor search, a conventional proximity search uses a point at one end of the exit ramp 335A as the center point of a radius of a circle and searches for locations of interest within a radius around the center point. The center point may be referred to as a node. All locations of interest within the circle are identified. To identify the location of interest 360A identified by the corridor search, the conventional proximity search uses a circle 370A that has a sufficient radius to reach the location of interest 360A. Within the circle 370A are the additional locations of interest 371A-380A, which may not be accessible to the route. As shown by FIG. 3A, the corridor search identifies a single location of interest 360A that is accessible to the route and does not identify the locations of interest 371A-380A.

A corridor search may produce more useful results than a radius-based proximity search, particularly when there is a great distance between interstate highway exits. In such a case, a proximity search may need to use a large radius to identify a location of interest along a route. The size of the radius used in a proximity search corresponds to the size of the search area used to identify locations of interest. The use of a large radius defines a larger search area (than when a smaller radius is used), which, in turn, increases the likelihood that more locations of interest will be identified that are farther from the route, which may not be convenient to the traveler.

Figure 4:
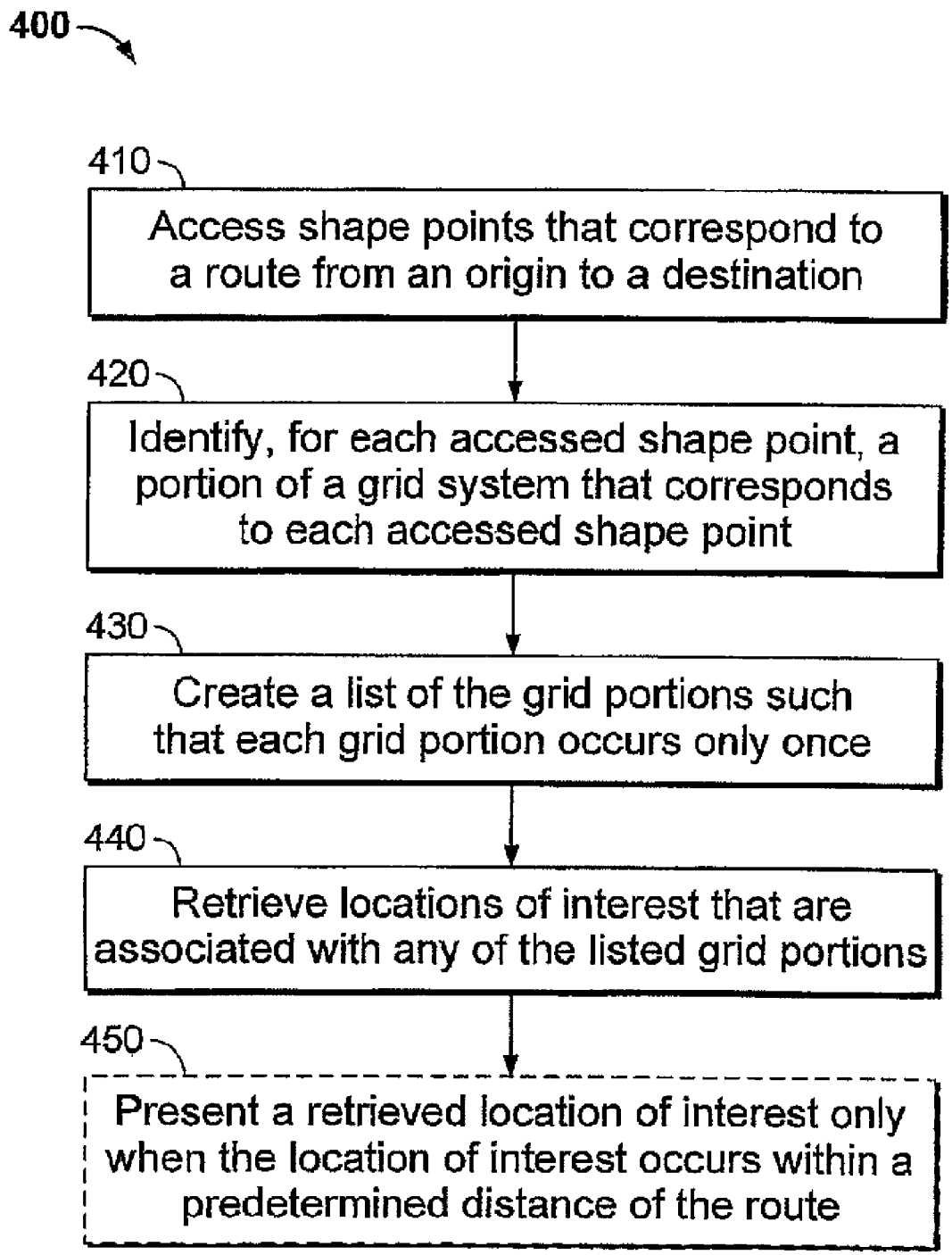
FIGS. 4 and 7 are flow charts depicting processes that use a corridor search to identify locations of interest along a travel route.
Figure 5:
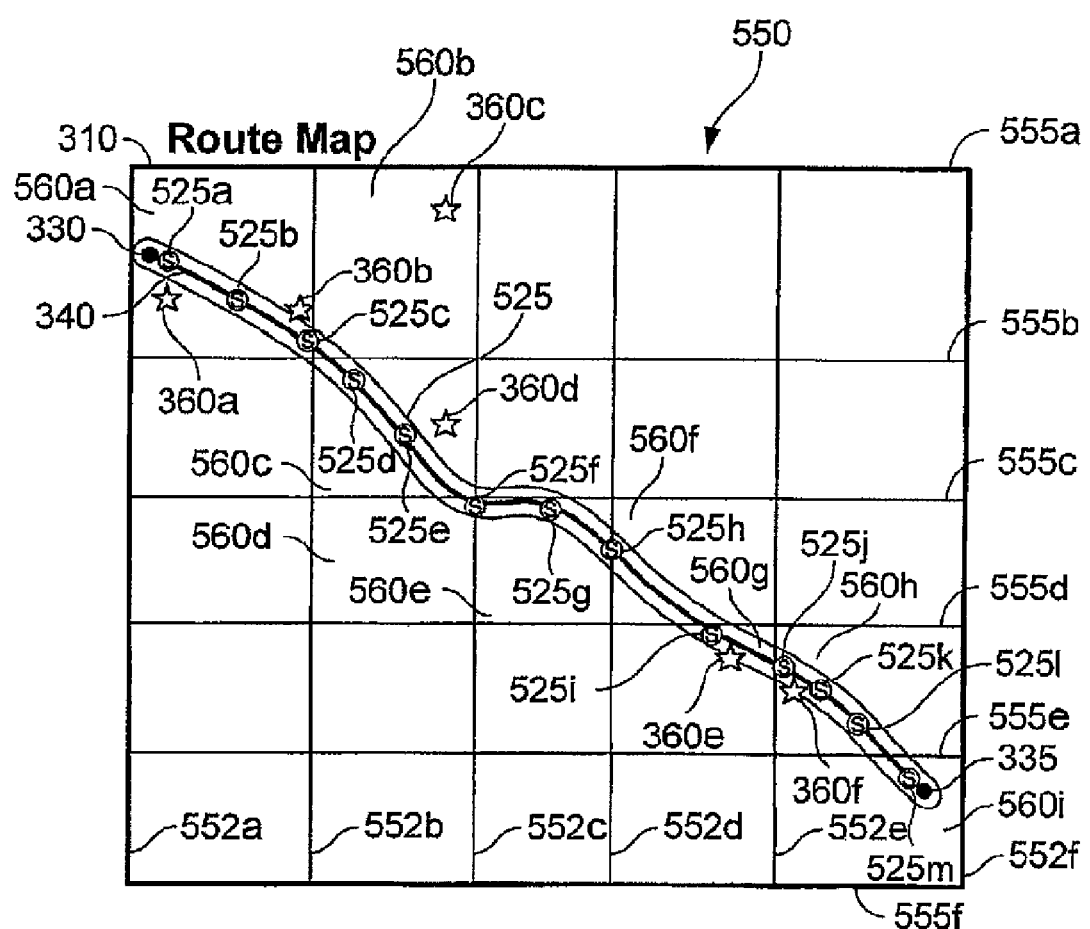

FIG. 4 illustrates an exemplary process 400 for using a corridor search to identify locations of interest along a route. The corridor search process 400 may be performed, for example, by the host system 210 of FIG. 2. To describe the corridor search process 400, FIG. 5 is used to illustrate the results of the process 400 on route map 310. FIG. 6 is used to illustrate aspects of the process 400 that are not shown by the route map 310 of FIG. 5.

The corridor search process 400 begins when the host system accesses shape points that correspond to a route from an origin location to a destination location (step 410). A shape point occurs where the shape of the route changes, such as at a curve in the route. A link is used to connect two shape points and represents a portion of the route where the route does not change shape. A shape point may be, for example, the longitude and latitude coordinate of a point included in the route. In some implementations, a shape point may be an endpoint of a vector having a quantity and direction representing the shape of a portion of the route. Accessing shape points that correspond to the route may be accomplished by accessing a list, table or another type of data structure that associates a shape point with a geographic location, which, in turn, is associated with the route. The associated shape points then may be retrieved from storage. In some implementations, the host system may access the shape points by receiving the shape points, such as receiving shape points in association with a request to initiate a corridor search process. The use of shape points that have been previously identified and/or received (rather than accessing shape points from remote storage that is accessible through a network) may be advantageous.

In an implementation of a routing system that generates a route by processing links (e.g., edges) in a graph that includes one or more links and two or more nodes, accessing shape points that correspond to the points in a route may be accomplished, for example, by retrieving, from data storage, a list of shape points that are associated with each link in a route.

Referring also to the route map 310 of FIG. 5, in contrast with route map 310 of FIG. 3, the route map 310 of FIG. 5 includes route 340 that includes several shape points 525, examples of which are identified at reference numerals 525a-525m. Each of shape points 525a-525m represents a particular longitude and latitude coordinate of a point along the route 340. FIG. 5 graphically illustrates these 525a-525m and other shape points 525a-525m along the route 340, whereas FIG. 6 provides a table 600 of shape points 620.

The host system then identifies a portion of a grid that corresponds to each accessed shape point (step 420). The grid identifies and references a region of geography over which the route traverses.

By way of example, and referring again to FIG. 5, a grid 550 may be used to delineate a region of geography that includes the route 340. The grid 550 includes vertical lines 552a-552f and horizontal lines 555a-555f. Thus, the grid 550 is formed by the intersections of the vertical lines 552a-552f and the horizontal lines 555a-555f such that the grid 550 includes rectangular grid portions 560a-560i. Each grid portion is delineated by two vertical lines and two horizontal lines. For example, the grid portion 560a is delineated by horizontal lines 555a and 555b and vertical lines 552a and 552b. Similarly, the grid portion 560f is delineated by horizontal lines 555c and 555d and vertical lines 552d and 552e. The grid portions 560a-560i include one or more of the shape points 525a-525m that correspond to the route 340 from origin 330 to destination 335.

In this example, the host system identifies the grid portions 560a-560i as corresponding to one or more of the shape points 525a-525m in the route 340. This may be accomplished, for example, by the host system accessing a list, a table or another type of data structure that associates a shape point with a grid portion to identify a grid portion that is associated with a particular shape point, such as 525a. The host system proceeds to determine the grid portion that corresponds to the other identified shape points, such as 525b-525m, until a grid portion has been identified as corresponding to each of the shape points 525a-525m along the route 340.

Table 600 identifies the grid portions 660 corresponding to each of shape points 525a-525m using grid portions 560a-560i of the grid 550 illustrated by FIG. 5. Table 600 illustrates the grid portions 660 that are retrieved based on an association with corresponding shape points 625. For example, shape point 525a corresponds to grid portion 560a, as shown by row 670 of table 600. Similarly, shape point 525b also corresponds to grid portion 560a, as indicated by row 671 of table 600. A grid portion may correspond to more than one shape point. For example, in table 600, grid portion 560a is shown to correspond to each of the shape points 525a and 525b. In fact, some grid portions may correspond to many shape points. For example, in table 600, grid portion 560e is shown to correspond to shape points 525f-525h, as illustrated by FIG. 5 and rows 675-677 of table 600.

In some implementations, some shape points may be associated with more than one grid portion. This may be useful, for example, when a shape point, such as the shape point 525f of FIG. 5, is on the border of two grid portions. Some implementations, however, may associate a shape point with only one grid portion.

The host system then optionally identifies the unique grid portions such that each grid portion (and each reference to a particular grid portion) occurs only once (step 430).

The host system may do so by creating a new list of grid portions, or it may instead examine a list of grid portions identified in step 420 and remove references to grid portions that are duplicates of other references to the same grid portion identified in the list.

The unique grid portions 690 that result from step 430 are illustrated in FIG. 6. In table 600, for example, grid portions 560a, 560b, 560c, 560e, 560g, 560h and 560i of the identified thirteen grid portions in grid portions 660 are unique.

The grid portions are identified in steps 420 and/or 430 as corresponding to the route collectively may be referred to as the route corridor. For example, in FIG. 5, the route corridor for the route 340 includes grid portions 560a-560i.

Having identified grid portions that form the route corridor in steps 420 and/or 430, the host system then retrieves locations of interest that are associated with the identified grid portions (step 440). When the host system has identified a unique list of grid portions, the locations of interest are identified only for the grid portions that are unique. When the host system has not identified a unique list of grid portions, the locations of interests are identified for each grid portion, even duplicated grid portions, is identified. Thus, by removing references to duplicated grid portions, a list of references to unique grid portions is used to retrieve locations of interest, which, in turn, may result in a more efficient, or perhaps a much more efficient, corridor search process.

The retrieval of locations of interest (step 440) may be accomplished, for example, by accessing a list, a table or another type of data structure containing locations of interest in which each location of interest is associated with a portion of a grid. The host system is able to retrieve locations of interest based on that association. Using the table 600 as an example, the host system retrieves locations of interest 695 that include the locations of interest 360a-360f. The retrieved locations of interest 360a-360f for the route are illustrated on FIG. 5.

The host system then presents some or all of the locations of interest that are associated with the route (step 450). Using FIG. 5 as an example, the host system presents the locations of interest 360a-360f which correspond to each of the grid portions 560a, 560b, 560c, 560e, 560g, 560h and 560i. As illustrated in FIG. 5, there may not necessarily be a location of interest for each grid portion.

Figure 7:
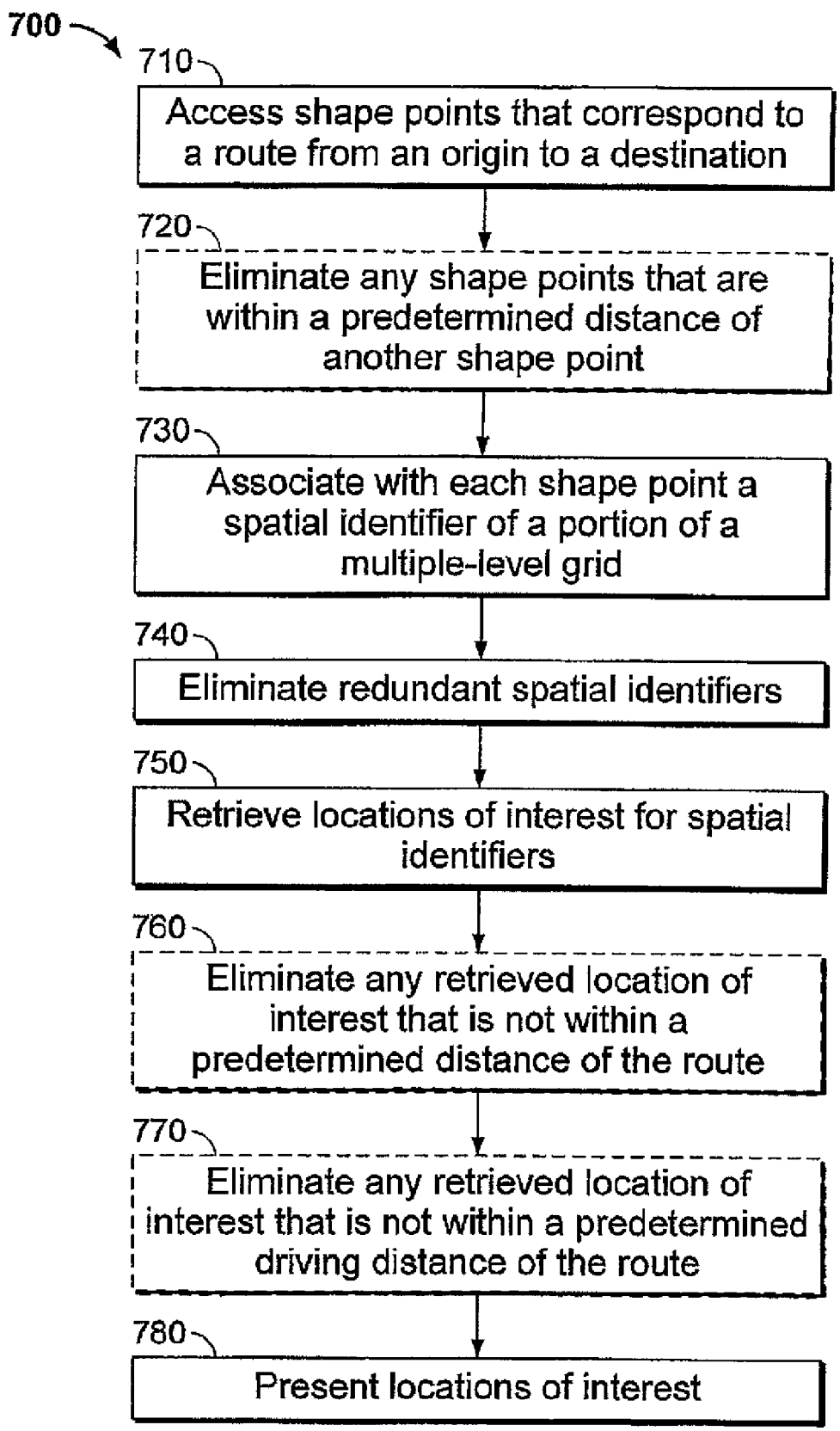
Figure 8:
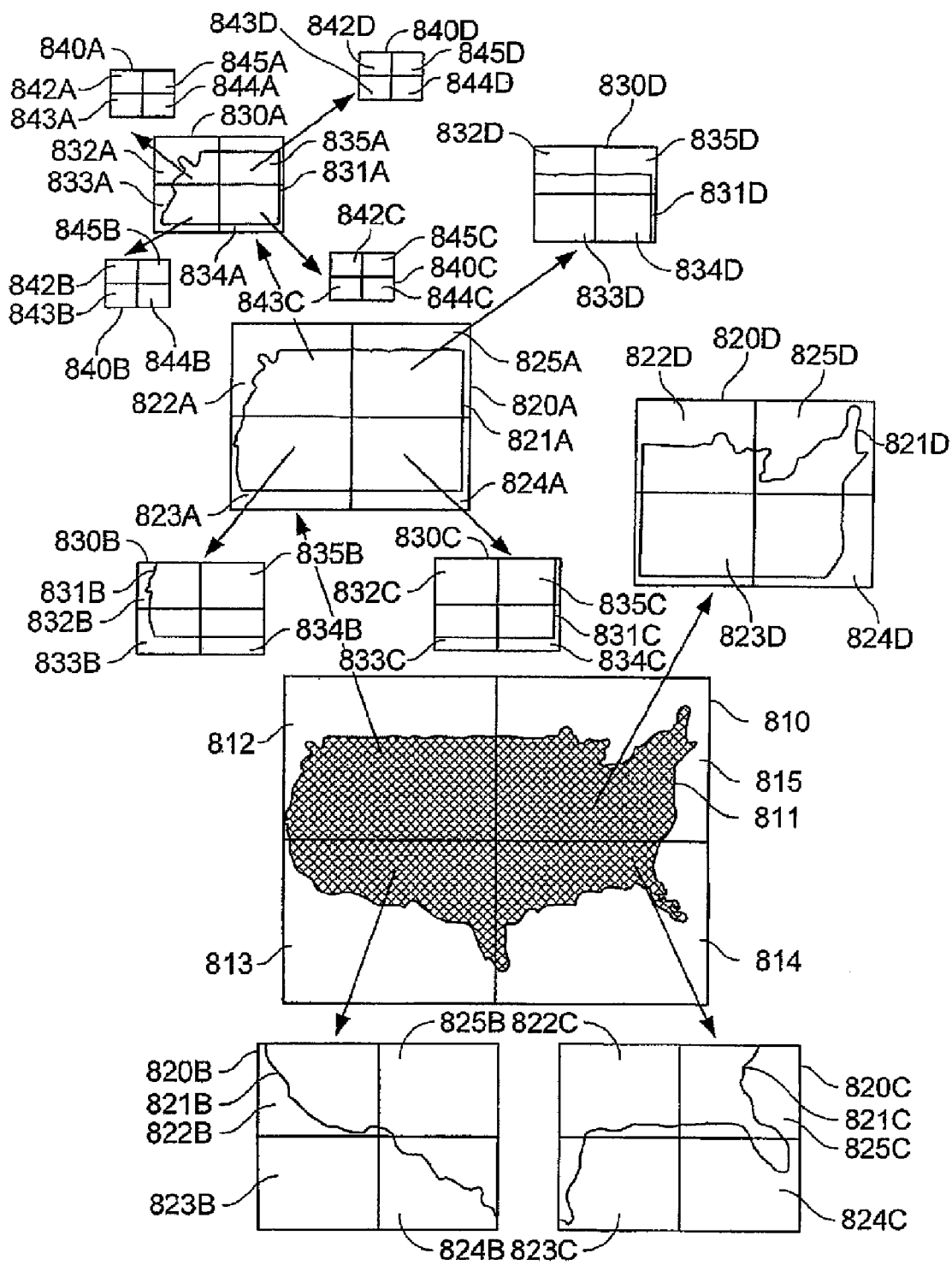
FIG. 8 is a diagram depicting a multiple-level, quadrant grid that recursively divides a geographic region for location-of-interest searching.

FIG. 7 illustrates an example process 700 for using a corridor search to identify locations of interest along a route. In contrast to process 400 of FIG. 4, the process 700 is illustrated using a hierarchy of grids 800 that has multiple levels, with each level being based on a quadrant, as illustrated in FIG. 8. A top-level grid 810 includes a region of geography 811 (here, the continental United States other than the State of Alaska) and four quadrants 812-815. Each quadrant 812, 813, 814 or 815 includes a portion of the region of geography 811.

The quadrant 812 corresponds to a grid 820A in the second-level of the grid hierarchy 800. The grid 820A includes a region of geography 821A (e.g., the Northwest portion of the continental United States in FIG. 8) that corresponds to the portion of geography included in quadrant 812 of the top-level grid 810. The second-level grid 820A also includes four quadrants 822A, 823A, 824A and 825A. Each quadrant 822A, 823A, 824A or 825A includes a portion of the region of geography 821A.

Similarly, the quadrant 813 corresponds to a grid 820B in the second-level of the grid hierarchy 800. The grid 820B includes a region of geography 821B (e.g., the Southwest portion of the continental United States in FIG. 8) that corresponds to the portion of geography included in quadrant 813 of the top-level grid 810. The second-level grid 820B also includes four quadrants 822B, 823B, 824B and 825B. Each quadrant 822B, 823B, 824B or 825B includes a portion of the region of geography 821B.

In the same manner, the quadrant 814 corresponds to a grid 820C in the second-level of the grid hierarchy 800. The grid 820C includes a region of geography 821C (e.g., the Southeast portion of the continental United States in FIG. 8) that corresponds to the portion of geography included in quadrant 814 of the top-level grid 810. The second-level grid 820C also includes four quadrants 822C, 823C, 824C and 825C. Each quadrant 822C, 823C, 824C or 825C includes a portion of the region of geography 821C.

In the same manner, the quadrant 815 corresponds to a grid 820D in the second-level of the grid hierarchy 800. The grid 820D includes a region of geography 821D (e.g., the Northeast portion of the continental United States in FIG. 8) that corresponds to the portion of geography included in quadrant 815 of the top-level grid 810. The second-level grid 820D also includes four quadrants 822D, 823D, 824D and 825D. Each quadrant 822D, 823D, 824D or 825D includes a portion of the region of geography 821D.

In this manner, each quadrant 812, 813, 814 or 815 of the top-level grid 810 corresponds to one of four grids, 820A, 820B, 820C or 820D, in the second-level of the grid hierarchy 800. Each quadrant 822A, 823A, 824A, 825A, 822B, 823B, 824B, 825B, 822C, 823C, 824C, 825C, 822D, 823D, 824D or 825D of each grid 820A, 820B, 820C or 820D of the second-level of the grid hierarchy 800 also corresponds to a grid in the third-level of the grid hierarchy 800. For brevity, only the four grids 830A, 830B, 830C and 830D of one of the second-level grids (specifically, grid 820A) are shown. The four grids of the second-level grid 820B are not shown. Similarly, the four grids of the second-level grids 820C and 820D are not shown.

The quadrant 822A corresponds to a grid 830A in the third-level of the grid hierarchy 800. The grid 830A includes a region of geography 831A that corresponds to the portion of geography included in quadrant 822A of the second-level grid 820A. The third-level grid 830A also includes four quadrants 832A, 833A, 834A and 835A, each quadrant 832A, 833A, 834A or 835A including a portion of the region of geography 831A.

Similarly, the quadrant 823A corresponds to a grid 830B in the third-level of the grid hierarchy 800. The grid 830B includes a region of geography 831B that corresponds to the portion of geography included in quadrant 823A of the second-level grid 820A. The third-level grid 830B also includes four quadrants 832B, 833B, 834B and 835B. Each quadrant 832B, 833B, 834B or 835B includes a portion of the region of geography 831B.

In the same manner, quadrant 824A corresponds to a grid 830C in the third-level of the grid hierarchy 800. The grid 830C includes a region of geography 831C that corresponds to the portion of geography included in quadrant 824A of the second-level grid 820A. The third-level grid 830C also includes four quadrants 832C, 833C, 834C and 835C. Each quadrant 832C, 833C, 834C or 835C includes a portion of the region of geography 831C.

In the same manner, the quadrant 821A corresponds to a grid 830D in the third-level of the grid hierarchy 800. The grid 830D includes a region of geography 831D that corresponds to the portion of geography included in quadrant 821A of the second-level grid 820A. The third-level grid 830D also includes four quadrants 832D, 833D, 834D and 835D. Each quadrant 832D, 833D, 834D or 835D includes a portion of the region of geography 831D.

In this manner, each quadrant 822A, 822B, 822C or 822D of the second-level grid 820A corresponds to one of four grids, 830A, 830B, 830C or 830D, in the third-level of the grid hierarchy 800. Each quadrant 832A, 833A, 834A, 835A, 832B, 833B, 834B, 835B, 832C, 833C, 834C, 835C, 832D, 833D, 834D or 835D of each grid 830A, 830B, 830C or 830D of the third-level of the grid hierarchy 800 also corresponds to a grid in the fourth-level of the grid hierarchy 800. For brevity, only the four grids 840A, 840B, 840C and 840D of one of the third-level grids (specifically, grid 830A) are shown.

The fourth-level grid 840A includes four quadrants 842A, 843A, 844A and 845A, each of which includes a portion of the geography (not shown) of the region of geography of the quadrant of the third-level grid (here, 832A) to which the quadrant corresponds. Similarly, fourth-level grid 840B includes four quadrants 842B, 843B, 844B and 845B; fourth-level grid 840C includes four quadrants 842C, 843C, 844C and 845C; and fourth-level grid 840D includes four quadrants 842D, 843D, 844D and 845D. Each quadrant includes a portion of the geography (not shown) of the region of the geography of the quadrant of the third-level grid to which the quadrant corresponds.

The hierarchy of grids 800 recursively defines the geography in which a route occurs. Each level of the hierarchy 800 further divides a portion of the geography included in the previous level. In the implementation of hierarchy of girds 800, the top-level includes four quadrants and each successive level includes four grids, each grid including four quadrants. The portion of geography that is included in each quadrant of each successive level decreases, as does the portion of geography included in each grid of each successive level.

The ability to locate a particular portion of the grid hierarchy and, hence, the route that travels through the portion of geography included in the grid hierarchy and attributes, such as locations of interest, may help reduce the time required to identify and access a particular portion of the grid or information that is associated with a particular portion of the grid.

Referring again to FIG. 7, the corridor search process 700 identifies locations of interest for a particular implementation of a routing system that generates a route by processing links (e.g., edges) in a graph that includes one or more links and two or more nodes. The corridor search process 700 may be performed, for example, by a host system, as described previously in FIG. 1 and FIG. 2.

The process 700 begins when the host system accesses shape points that correspond to a route from an origin to a destination (step 710), as described previously with respect to step 410 of FIG. 4. The host system may optionally eliminate any shape points that are within a predetermined distance of another shape point (step 720). This may be accomplished, for example, by performing a pairwise comparison of each shape point to another shape point. More specifically, in grid system 500 of FIG. 5, the distance from shape point 525*a* to other shape points may be determined. In this example, the shape points 525*b*-525*c* are within a predetermined threshold distance of shape point 525*a*, and consequently, so the shape points 525*b*-525*c* are eliminated from the shape points being processed in the corridor search process 700. The host system then identifies another shape point to be used in the comparison. In this case, the host system identifies the shape point 525*d*, which is not within a predetermined distance of shape point 525*a*. The host system proceeds by comparing the distance between the shape point 525*d* and the shape point 525*e* to the predetermined threshold distance, eliminating shape point 525*e* when the distance falls within the predetermined threshold distance. This process continues until each shape point 525 has been compared with at least one other shape point, and preferably its closest neighboring shape point, which may be readily identifiable using the grid techniques of FIG. 8. The predetermined threshold distance may be user-configurable or program-configurable so as to allow an implementation of process 700 to be more efficiently used in a particular context. The elimination of shape points prior to identifying grid portions for each shape point may help improve the efficiency of performing the corridor search process 700.

With each shape point, a spatial identifier is associated with a portion of a multiple-level grid (step 730). Using the grid 800 of FIG. 8 as an example, the host system determines a spatial identifier associated with a region of the grid, such as a quadrant in one of the levels of the grid hierarchy. This may be accomplished, for example, when a spatial identifier is assigned to each quadrant of each level of the grid hierarchy and stored in persistent storage. The use of a multiple-level grid system may allow information about locations of interest within a quadrant to be more efficient.

The host system then eliminates redundant spatial identifiers (step 740). The elimination of redundant spatial identifiers may help increase the efficiency with which the corridor search process 700 is performed. At this point in the process 700, the route may be represented by a series of grid quadrants, with each grid quadrant being associated with a spatial identifier. The series of grid quadrants may define or be known as a corridor for the route. The quadrants of the levels of the grid system that make up the route are analogous to the grid portions illustrated in FIG. 5 for the route.

The host system retrieves one or more locations of interests that are associated with each spatial identifier (step 750). This may be accomplished, for example, by accessing a list, a table or another type of data structure that contains associations between a location of interest identifier and a spatial identifier. Using a locations of interest identifier associated with a spatial identifier, the location of interest may be retrieved from a database of locations of interest. A location of interest represents an item in the database and may be categorized by location type.

A grid system that includes locations of interest identified by latitude and longitude coordinates may be used to identify locations of interest, as described previously with respect to FIG. 4. The use of a spatial identifier for a multiple-level grid system to search for locations of interest along a route may be more efficient than searching for locations of interest using latitude and longitude coordinates.

Figure 9:
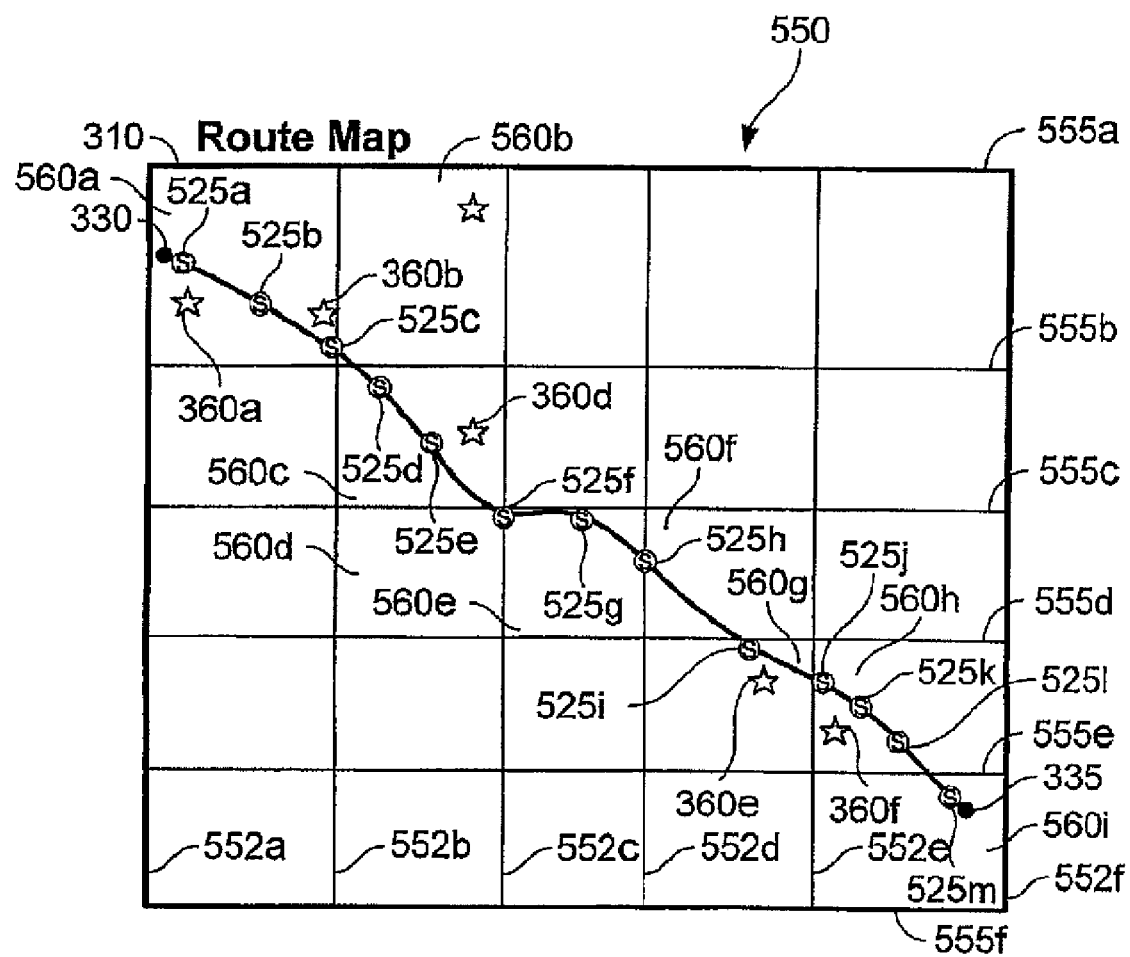

With reference to the location(s) of interest retrieved (step 450), the host system may eliminate locations of interest that fail to meet a predetermined criterion (e.g., those locations of interest that are not within a predetermined distance of the route) (step 760). In a more specific example, locations of interest are eliminated unless they are within two miles of the route. FIG. 9 illustrates the result of the elimination of any retrieved location that is not within a predetermined distance of the route. FIG. 9 only includes locations of interest 360*a*, 360*b*, 360*d*, 360*e* and 360*f*. The location of interest 360*c* that is included in FIG. 5 is not included in FIG. 9.

In another example of a predetermined criterion, locations of interest may be eliminated unless they are within a predetermined driving distance of the route. To do so, a route determination process may be used to determine a driving route from the location of interest to the route. The distance of the driving route may be determined, and any location of interest that is not within a predetermined driving distance of the route is eliminated. The elimination of locations of interest based on the driving distance of the locations of interest to the route may produce more useful results. For example, a location of interest may be far from the route when distance is calculated based on driving distance but close to the route when distance is calculated based on straight-line distance (which may be referred to in vernacular language as a "how-the-crow-flies" distance). Therefore, more useful results may be presented when a locations of interest is eliminated based on a predetermined threshold based on driving distance from the route as compared with a predetermined threshold based on straight-line distance from the route.

The locations of interest are presented (step 780), as previously described in step 450 of FIG. 4.

The corridor search process 700 may be able to identify locations of interest along a route wherein the locations identified relate to the route shape (and not a distance from a point in the route or a predefined polygon shape). This may, in torn, result in a process that is more efficient than conventional locations of interest search techniques. The results of corridor search process 700 may identify locations of interest that are sufficiently close to the route so as to be useful to the traveler.

Figure 10:
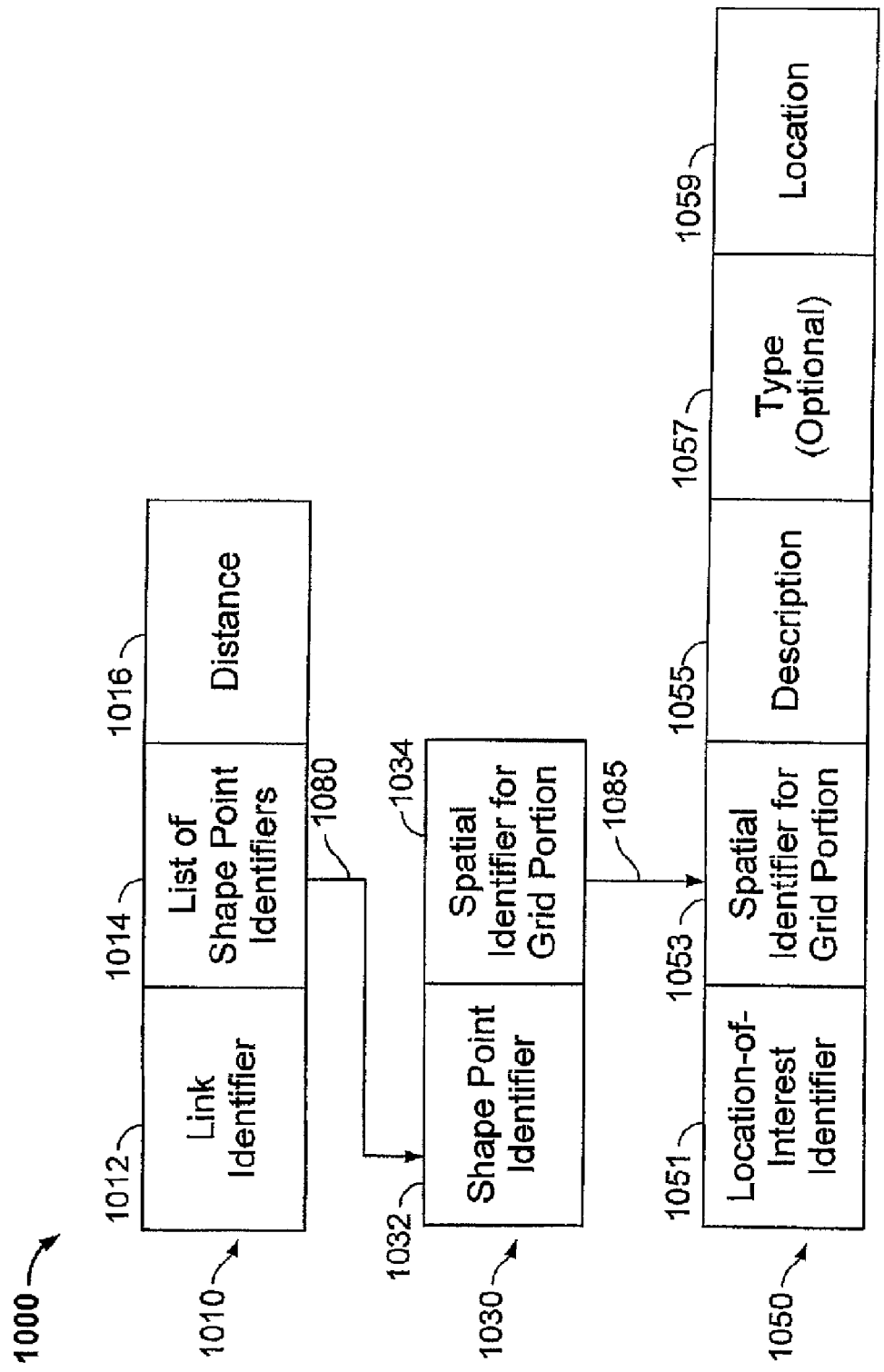
FIG. 10 is a block diagram of example data structures used to determine locations of interest along a travel route.

FIG. 10 illustrates exemplary data structures 1000 that may be used by a corridor search process performed by a processor of a computing device. The data structures shown in FIG. 10 may be used by a particular implementation of a routing system that generates a route and locations of interest by processing links (e.g., edges) in a graph that includes one or more links.

The exemplary data structures 1000 include a data structure 1010 for link information, a data structure 1030 for associating a shape point with a portion of a grid, and a data structure 1050 for a location of interest.

The data structure 1010 for link information may be used to identify the links included in a route for which locations of interest are being identified. The data structure 1010 represents an example of how link information may be organized.

The link data structure 1010 includes a link identifier 1012, a list of shape point identifiers 1014, and a distance 1016. The link identifier 1012 uniquely identifies a particular link. The list of shape point identifiers 1014 identifies all of the shape point points that are included in the link. Each shape point included in the link is identified by a unique shape point identifier. The distance 1016 indicates the distance to traverse the link. The distance 1016 may be useful when locations of interest are eliminated that are not within a predetermined driving distance of the route, as described in step 770 of FIG. 7.

The exemplary data structures 1000 also include a data structure 1030 for associating a shape point with a portion of a grid. The associative data structure 1030 includes a shape point identifier 1032 and a spatial identifier 1034 for a grid portion. The shape point identifier 1032 uniquely identifies a shape point, and the spatial identifier 1034 uniquely identifies a portion of a grid, such as a grid quadrant of a multiple-level grid system for a region of geography. Thus, the associative data structure 1030 identifies the portion of the grid that corresponds to a particular shape point.

The example data structures 1000 also include a data structure 1050 for a location of interest. The location-of-interest data structure 1050 includes a location-of-interest identifier 1051, a spatial identifier 1053, a description 1055, optionally, a type 1057 of location, and a location 1059. The location-of-interest identifier 1051 uniquely identifies a location-of-interest, and the spatial identifier 1053 uniquely identifies a portion of a grid portion, as described previously. The location-of-interest data structure 1050 thus identifies a particular location of interest that is located in the portion of the grid identified by the spatial identifier 1053.

The description 1055 of the location of interest may include, for example, a name of the location of interest, a textual description about the location of interest, and hours of operation (when applicable). The type 1057 of the location of interest may be included as an optional component of the data structure 1050 shown by this example. Types of locations of interest have been previously described and may include, for example, the type of restaurant, gas station, lodging, entertainment or educational opportunity, and landmark. Location 1059 identifies the particular location of the location of interest within the grid portion. The location 1059 may be identified, for example, through the use of latitude and longitude coordinates.

A particular link having the link data structure 1010 may be related to a particular association having the associative data structure 1030. The related association in the associative data structure 1030 may be identified by using a particular shape point identifier in the list of shape point identifiers 1014 to identify a corresponding shape point identifier 1032 in the associative data structure 1030. This is illustrated by flow line 1080.

A particular association having the associative data structure 1030 also may be related to one or more locations of interest having the location-of-interest data structure 1050. The related location of interest may be identified by using a particular spatial identifier 1034 in the associative data structure 1030 to identify a corresponding spatial identifier 1053 in the location-of-interest data structure 1050. This is illustrated by flow line 1085.

Figure 11:
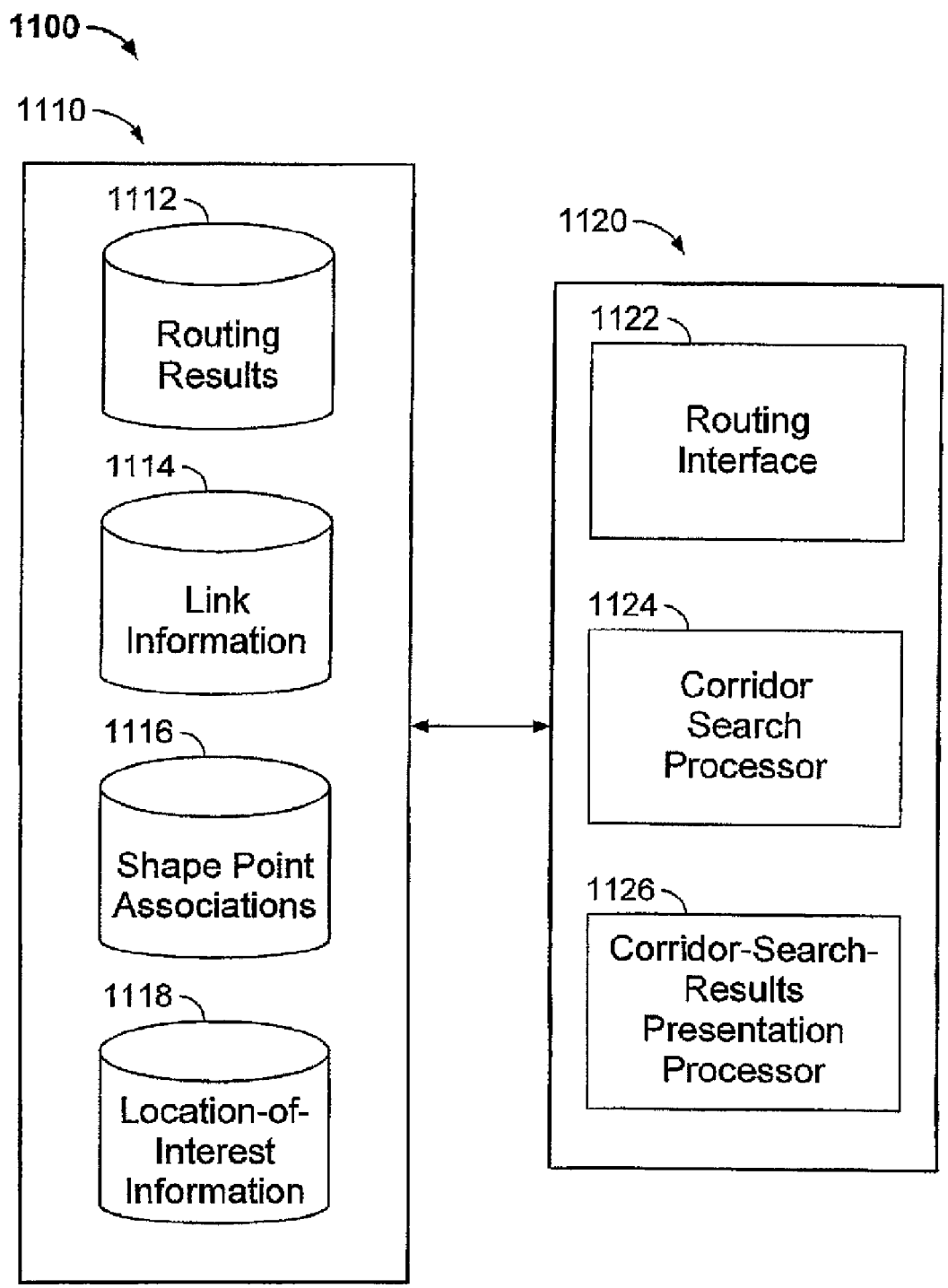
FIG. 11 is a diagram of components that may be used for identifying locations of interest along a travel route.

FIG. 11 depicts the components 1100 that may be used in performing a corridor search. The components 1100 include data components 1110 and processing components 1120. The processing components 1120 may be implemented using host device 135 of FIG. 1 or host device 235 of FIG. 2. The data components 1110 may be stored on persistent storage associated with host device 135 of FIG. 1 or host device 235 of FIG. 2.

The data components 1110 include routing results 1112, link information 1114, shape point associations 1116, and location-of-interest information 1118. The routing results 1112 store information about a route determined, for example, by a route determination process. The link information 1114 stores information about links, as described with respect to link data structure 1010 of FIG. 10. The shape point associations 1116 store the associations between shape points and grid portions, as described previously with respect to associative data structure 1030 of FIG. 10. The location-of-interest information 1118 stores information, including a corresponding spatial identifier for a grid portion, for a location-of-interest, as described with respect to location-of-interest data structure 1050 of FIG. 10.

The processing components 1120 include a routing interface 1122, a corridor is search processor 1124, and a corridor-search-results presentation processor 1126.

The routing interface 1122 provides a programmatic interface to a routing system that previously has determined a route from an origin location to a destination location. For example, the routing interface 1122 may receive the link identifiers for all of the links that are included in a particular route and store the received link identifiers in routing results 1112.

The corridor search processor 1124 directs and controls the identification of locations of interests for the route, such as described with respect to FIG. 4 or 7. To do so, in general, a corridor search process identifies locations of interest for a route using routing results 1112, link information 1114, shape point associations 1116 and location-of-interest information 1118.

For each link in the route stored in routing results 1112, the corridor search processor performs a corridor search process. The corridor search processor 1124 accesses link information 1114 for a particular link in the route stored in routing results 1118. To access shape points that correspond to the link, the corridor search processor uses the list of shape point identifiers 1014 for the particular link (that is represented using link data structure 1010) in link information 1114 (steps 410 of FIGS. 4 and 710 of FIG. 7).

Using the list of shape point identifiers 1014, the corridor search processor 1124 identifies a portion of the gird that corresponds to each of the shape points in the list of shape point identifiers 1014 (steps 420 of FIG. 4 and 730 of FIG. 7). To do so, the corridor search processor 1124 accesses the shape point identifier 1032 represented in the data structure 1030 in the stored shape point associations 1116. The accessed shape point identifier 1032 corresponds to one of the shape point identifiers in the list of shape point identifiers 1014 in the data structure 1010 in stored link information 1114. The corridor search processor 1124 then is able to identify the grid portion that is associated with the accessed shape point identifier. The grid portion identification is based on the spatial identifier for a grid portion 1034 that is associated with the accessed shape point identifier 1032 in the shape point association data structure 1030 that is stored in shape point associations 1116.

The corridor search processor 1124 then retrieves the locations of interest that correspond to the identified grid portion (steps 440 of FIG. 4 and 750 of FIG. 7). For example, the corridor search processor 1124 may access, in the stored location-of-interest information 1118, the locations of interest that include a spatial identifier of a grid portion 1053 that correspond to the spatial identifier of a grid portion 1034 identified in the stored shape point associations 1116.

The corridor search processor 1124 may store the identified locations of interest in routing results 1112 and may provide the locations of interest results to the corridor-search-results presentation processor 1126 for their presentation.

Although FIGS. 1-11 illustrate systems and methods for determining a preferred driving route, the techniques are not limited to driving routes. These techniques may be applicable to determining a preferred route using other modes of transportation (e.g., walking, bicycling, flying, swimming, or navigating a water route). These techniques may be applicable, for example, to one or more computing devices for determining a preferred route that communicate in a client system and host system (e.g., an Internet access provider or an Internet service provider) relationship, a single computing device (e.g., with or without networking capabilities), or an embedded system (e.g., a navigation routing system in an automobile or other vehicle).

Implementations may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

Other implementations are within the scope of the following claims.

What is claimed is:

1. A method comprising:
   receiving a request for a route from a first location to a second location;
   determining, based on the received request, a route from the first location to the second location;
   determining an area which is spatially related to the route, and within which to identify points of interest;
   identifying a first grid pattern within the area spatially related to the route, the first grid pattern encompassing a portion of the area spatially related to the route;
   identifying locations of interest associated with the first grid pattern;
   identifying a second grid pattern within the area spatially related to the route, the second grid pattern encompassing the first grid pattern and a broader area;
   identifying locations of interest associated with the second grid pattern; and
   enabling rendering of the route with at least a portion of the area spatially related to the route including one or more locations of interest identified as associated with the first or second grid patterns.

2. The method of claim 1 wherein:
   identifying locations of interest associated with the first grid pattern includes searching data corresponding to locations of interest for identifiers of the first grid pattern; and
   identifying locations of interest associated with the second grid pattern includes searching data corresponding to locations of interest for identifiers of the second grid pattern.

3. The method of claim 1 wherein identifying locations of interest associated with the first grid pattern comprises:
   determining distances of locations of interest to one or more points within the first grid pattern;
   comparing the determined distances to a threshold distance; and
   eliminating locations of interest when the determined distance for a location of interest is not within the threshold distance.

4. The method of claim 1 wherein the first and second grid patterns each represent a different level in a hierarchy of groups of grid patterns.

5. The method of claim 4 further comprising:
   associating, with the first and second grid patterns, a spatial identifier of a portion of a hierarchy of grid patterns, and wherein
   identifying locations of interest associated with the first grid pattern comprises identifying locations of interest that are associated with the spatial identifier associated with the first grid pattern and identifying locations of interest associated with the second grid pattern comprises identifying locations of interest that are associated with the spatial identifier associated with the second grid pattern.

6. A method comprising:
   determining a grid area to be searched for locations of interest;
   identifying locations of interest associated with a first subsection, the first subsection encompassing at least a portion of the determined grid area;
   identifying locations of interest associated with a second subsection, the second subsection encompassing the portion of the determined grid area and a broader grid area; and
   enabling rendering of at least a portion of the determined grid area including one or more locations of interest identified as associated with the first or second subsections.

7. The method of claim 6 wherein determining a grid area to be searched for locations of interest includes determining a geographic area.

8. The method of claim 6 wherein identifying a grid area to be searched for locations of interest includes identifying a route to a destination.

9. The method of claim 6 wherein:
   identifying locations of interest associated with the first subsection includes searching data corresponding to locations of interest for identifiers of the first subsection; and
   identifying locations of interest associated with the second subsection includes searching data corresponding to locations of interest for identifiers of the second subsection.

10. The method of claim 6 further comprising identifying portions of the determined grid area that have been redundantly identified and eliminating the redundantly identified portions of the grid area.

11. The method of claim 6 wherein identifying locations of interest associated with the first subsection comprises:
    determining distances of locations of interest to one or more points within the first subsection;
    comparing the determined distances to a threshold distance; and
    eliminating locations of interest when the determined distance for a location of interest is not within the threshold distance.

12. The method of claim 11 wherein the threshold distance is user-configurable.

13. The method of claim 11 wherein the threshold distance is program-configurable and differs based on context.

14. The method of claim 6 wherein identifying locations of interest associated with the first subsection comprises:
    determining driving distances of locations of interest to points within the first subsection;
    comparing the determined driving distances to a threshold driving distance; and
    eliminating locations of interest when the determined driving distance for a location of interest is not within the threshold driving distance.

15. The method of claim 6 wherein the first and second subsections represent different levels in a hierarchy of subsections.

16. The method of claim 15 further comprising:
associating, with the first and second subsections, a spatial identifier of a portion of a hierarchy of subsections, and wherein
identifying locations of interest associated with the first subsection comprises identifying locations of interest that are associated with the spatial identifier associated with the first subsection and identifying locations of interest associated with the second subsection includes comprises identifying locations of interest that are associated with the spatial identifier associated with the second subsection.

17. The method of claim 15 wherein each level of the hierarchy of subsections includes four quadrants.

18. The method of claim 6 further comprising rendering of the grid area using a personal digital assistant.

19. The method of claim 6 further comprising rendering of the grid area using an on-board navigation system.

20. The method of claim 6 wherein a location of interest is identified based on an indirect association between a location of interest and a subsection.

21. An apparatus configured to:
determine a grid area to be searched for locations of interest;
identify locations of interest associated with a first subsection, the first subsection encompassing at least a portion of the determined grid area;
identify locations of interest associated with a second subsection, the second subsection encompassing the portion of the determined grid area and a broader grid area; and
enable rendering of at least a portion of the determined grid area including one or more locations of interest identified as associated with the first or second subsections.

22. The apparatus of claim 21 wherein the apparatus is further configured to identify a geographic area.

23. The apparatus of claim 21 wherein the apparatus is further configured to identify a route.

24. The apparatus of claim 21 wherein the apparatus is further configured to:
search data corresponding to locations of interest for identifiers of the first subsection; and
search data corresponding to locations of interest for identifiers of the second subsection.

25. The apparatus of claim 21 wherein the apparatus is further configured to identify portions of the determined grid area that have been redundantly identified and eliminate the redundantly identified portions of the grid area.

26. The apparatus of claim 21 wherein the apparatus is further configured to:
determine distances of locations of interest to one or more points within the first subsection;
compare the determined distances to a threshold distance; and
eliminate locations of interest when the determined distance for a location of interest is not within the threshold distance.

27. The apparatus of claim 26 wherein the apparatus is further configured such that the threshold distance is user-configurable.

28. The apparatus of claim 26 wherein the apparatus is further configured such that the threshold distance is program-configurable and differs based on context.

29. The apparatus of claim 28 wherein the apparatus is further configured to:
determine driving distances of locations of interest to points within the first subsection;
compare the determined driving distances to a threshold driving distance; and
eliminate locations of interest when the determined driving distance for a location of interest is not within the threshold driving distance.

30. The apparatus of claim 28 wherein the apparatus is further configured such that the first and second subsections represent different levels in a hierarchy of subsections.

31. The apparatus of claim 30 wherein the apparatus is further configured to:
associate, with the first and second subsections, a spatial identifier of a portion of a hierarchy of subsections;
identify locations of interest that are associated with the spatial identifier associated with the first subsection; and
identify locations of interest that are associated with the spatial identifier associated with the second subsection.

32. The apparatus of claim 30 wherein the apparatus is further configured such that each level of the hierarchy of subsections includes four quadrants.

33. The apparatus of claim 21 wherein the apparatus is further configured to render the grid area using a personal digital assistant.

34. The apparatus of claim 21 wherein the apparatus is further configured to render the grid area using an on-board navigation system.

35. The apparatus of claim 21 wherein the apparatus is further configured such that a location of interest is identified based on an indirect association between a location of interest and a subsection.

36. An apparatus comprising:
a processor configured to determine a grid area to be searched for locations of interest;
means for identifying locations of interest associated with a first subsection, the first subsection encompassing at least a portion of the determined grid area and;
means identifying locations of interest associated with a second subsection, the second subsection encompassing the portion of the determined grid area and a broader grid area; and
a display configured to enable rendering of at least a portion of the determined grid area including one or more locations of interest identified as associated with the first or second subsections.

37. A method for enabling rendering of a route including one or more locations of interest, the method comprising:
receiving, from a user at a client, a request for a route from a first location to a second location;
determining, based on the received request, a route from the first location to the second location;
determining an area which is spatially related to the route, and within which to identify points of interest;
identifying a first grid pattern within the area spatially related to the route, the first grid pattern encompassing a portion of the area spatially related to the route;
identifying locations of interest associated with the first grid pattern;
identifying a second grid pattern within the area spatially related to the route, the second grid pattern encompassing the portion of the area spatially related to the route and a broader area;
identifying locations of interest associated with the second grid pattern; and
enabling rendering, of the route with at least a portion of the area spatially related to the route including one or more locations of interest identified as associated with the first or second grid patterns.

* * * * *